United States Patent
Spravsow et al.

[19]

[11] Patent Number: 6,112,608

[45] Date of Patent: Sep. 5, 2000

[54] LONG REACH SHIFT ARM

[75] Inventors: Jenny Y. Spravsow, Sterling Heights; Nelson A. Kothe, Manchester; Stephan A. Vitous, Howell, all of Mich.

[73] Assignee: DaimlerChrysler Corporation, Auburn Hills, Mich.

[21] Appl. No.: 09/221,021

[22] Filed: Dec. 23, 1998

[51] Int. Cl.[7] .......................... F16H 59/02; G01L 25/00; A41F 1/00

[52] U.S. Cl. .................. 74/335; 24/514; 73/117; 74/586; 74/473.12

[58] Field of Search .................. 24/514, 569; 73/117; 74/335, 473.12, 586

[56] References Cited

U.S. PATENT DOCUMENTS

| | | | |
|---|---|---|---|
| 213,359 | 3/1879 | Taylor | 74/586 X |
| 3,713,332 | 1/1973 | Herrbrich | 73/117 |
| 4,466,279 | 8/1984 | Gable et al. | 73/117 |
| 4,572,229 | 2/1986 | Mueller et al. | 137/99 |
| 4,649,742 | 3/1987 | Klausnitzer et al. | 73/117 |
| 4,960,008 | 10/1990 | Yen et al. | 73/117 X |
| 5,363,027 | 9/1995 | Noguchi | 74/335 X |
| 5,372,035 | 12/1994 | Ogawa et al. | 73/117 |
| 5,448,925 | 9/1995 | Mcfadden | 74/335 |
| 5,821,718 | 10/1998 | Shaffer et al. | 318/587 |
| 5,835,867 | 11/1998 | Froelich et al. | 73/117 X |

*Primary Examiner*—Allan D. Herrmann

[57] ABSTRACT

A robotic device is provided for moving a shift lever of a vehicle including a shift actuator device drivingly connected to an elongated shift arm which is connected to a bracket assembly which is adapted to be mounted to a shift lever. The shift arm has a longitudinally extending elongated slot which is adjustably engaged by the shift actuator device.

3 Claims, 4 Drawing Sheets

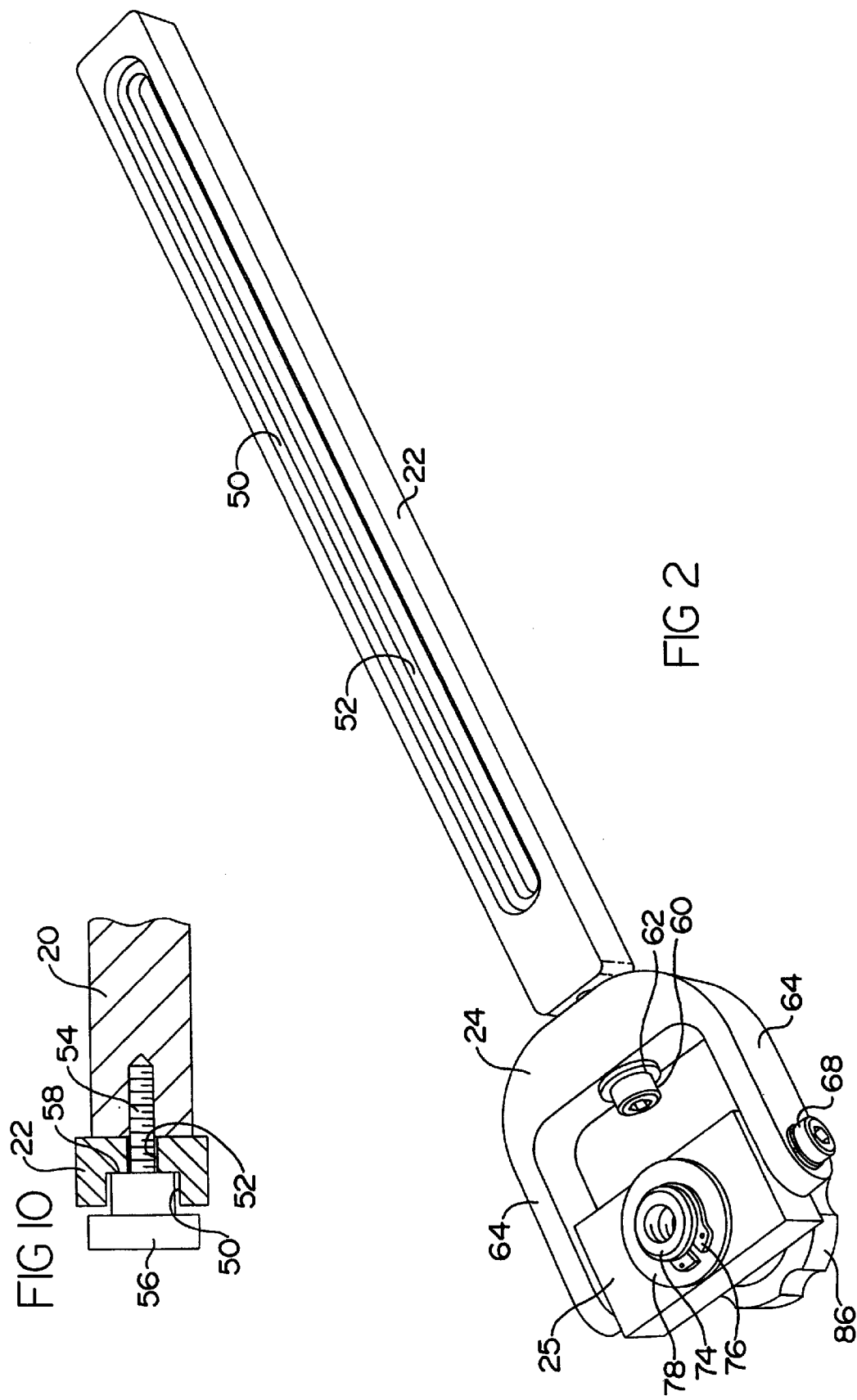

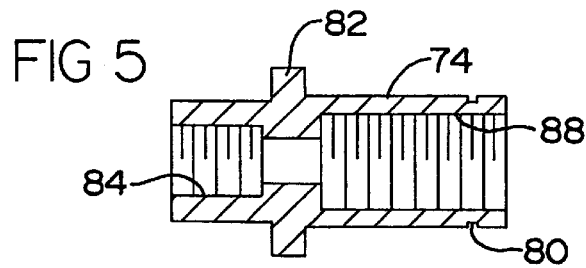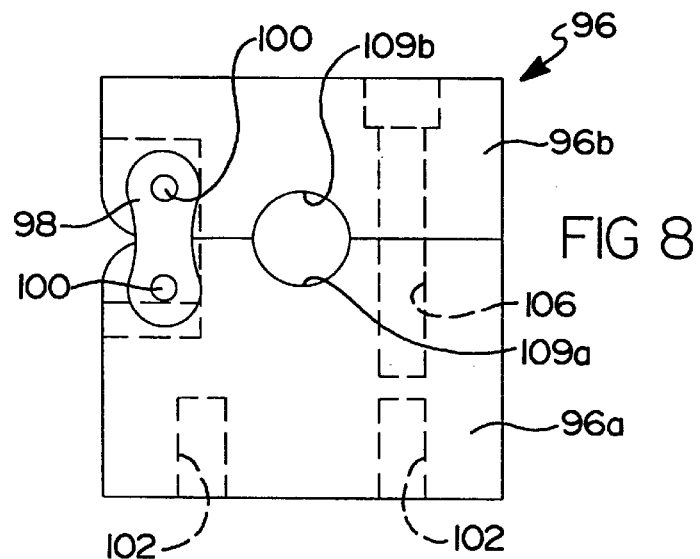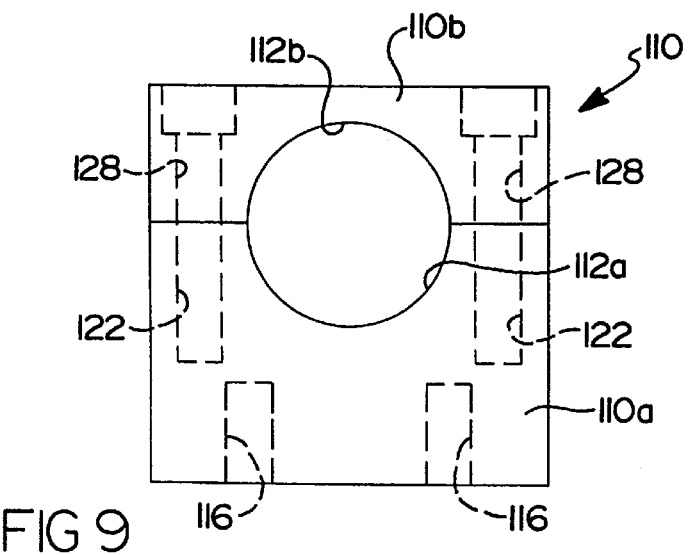

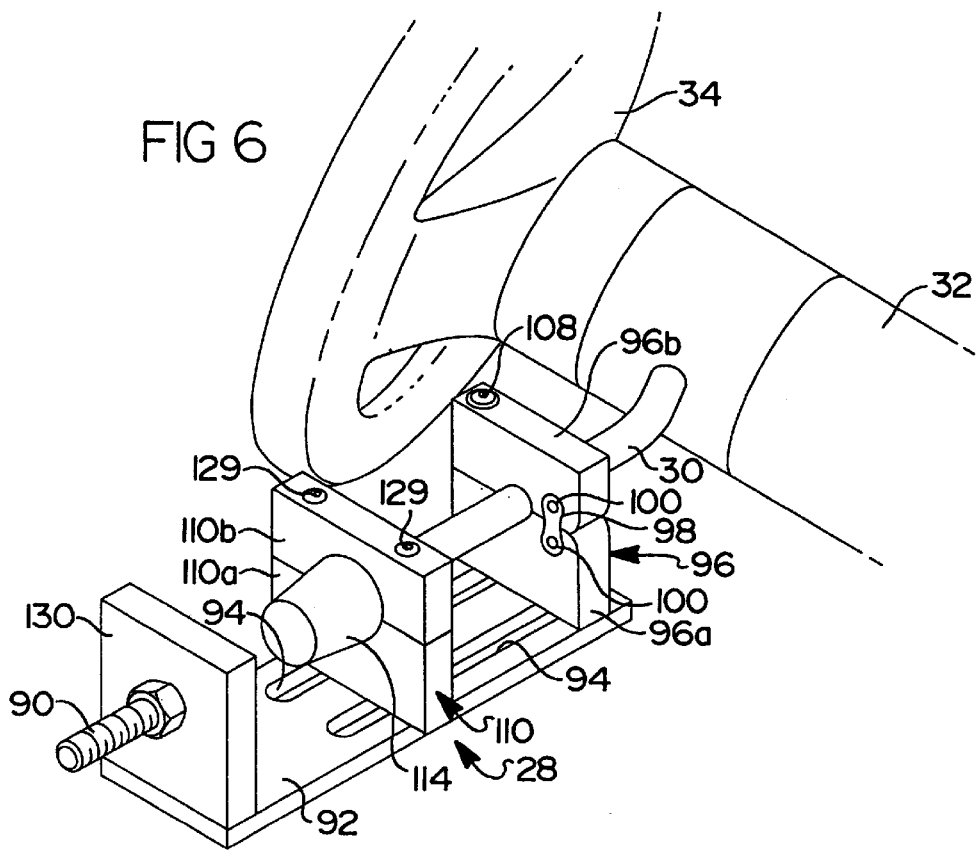
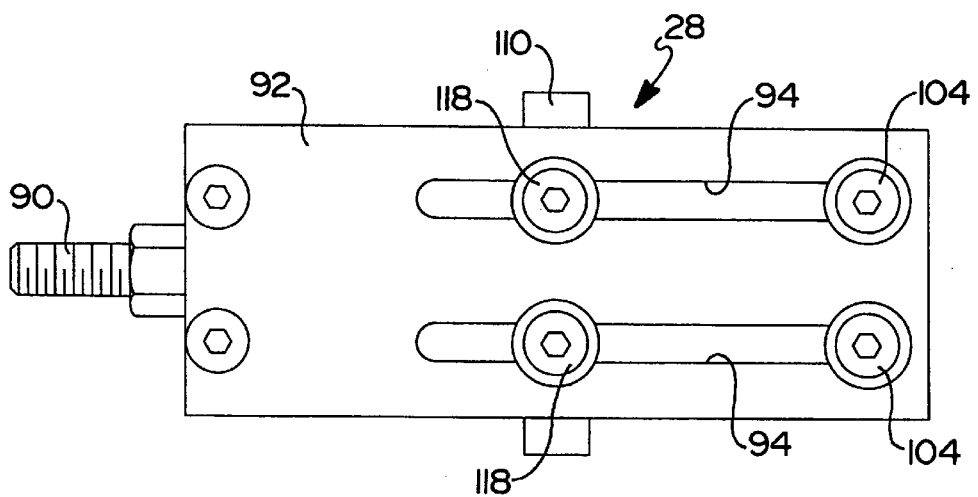

LONG REACH SHIFT ARM

BACKGROUND OF THE INVENTION

1. Field of the Invention

The present invention relates generally to automobile testing, and more particularly to computer-controlled robotic mileage accumulator testing devices.

2. Background and Summary of the Invention

New models of vehicles are thoroughly tested by manufacturers at proving grounds and on mileage accumulating dynamometers prior to marketing the vehicles. Indeed, vehicle models that have been marketed for some time often undergo continued testing. Such testing includes prolonged operation of test vehicles around a test track or on a dynamometer, to determine the vehicle's operational fitness. Since the advantages of vehicle testing in ensuring safe, satisfactory vehicles has long been recognized, vehicle testing has become a necessary part of vehicle development. It can be readily appreciated, however, that using human drivers to test drive vehicles hundreds of thousands of miles is economically costly for manufacturers, and physically demanding on the drivers.

More and more, manufacturers are using computer-controlled robotic devices for testing vehicles. Therefore, test costs are significantly reduced and test driver fatigue and discomfort are eliminated. The present invention provides a column shift adapter for a robotic test driving mechanism which is designed to mount to the shift lever of a vehicle. The shift adapter includes a base plate having a pair of elongated slots. A first clamp block is adjustably mounted to the base plate for adjustably sliding engagement with the pair of elongated slots and includes an upper and a lower block portion pivotally connected to one another. A second clamp block is adjustably mounted to the base plate for adjustable sliding engagement with the pair of elongated slots and also includes an upper and a lower block portion connected to one another. An arm mounting block is securely fastened to the base plate and includes a fastener member attached to the arm mounting block which is adapted to be mounted to an elongated shift arm of the robotic test driving mechanism.

The column shift adapter is mounted on the end of the elongated shift arm having a longitudinally extending elongated slot. The shift actuator device adjustably engages the elongated slot of the shift arm so that the shift actuator device can be utilized with a variety of vehicles having different distances between the vehicle seat and the shift lever.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 2 is a perspective view of the shift arm and bracket mechanism according to the principles of the present invention;

FIG. 5 is a cross-sectional view of the cap screw which is mounted in the adapter plate according to the principles of the present invention;

FIG. 6 is a perspective view of the column shift bracket assembly mounted to the shift lever of a steering column according to the principles of the present invention;

FIG. 7 is a bottom view of the column shift bracket assembly according to the principles of the present invention;

FIG. 8 is a side view of the pivot clamp block which is mounted to the column shift bracket assembly according to the principles of the present invention;

FIG. 9 is a side view of the clamp block assembly which is mounted to the column shift bracket assembly of the present invention; and FIG. 10 is a cross-sectional view showing the connection between the shift arm and the arm of the robotic driving device.

DETAILED DESCRIPTION OF THE PREFERRED EMBODIMENTS

Figure 1:
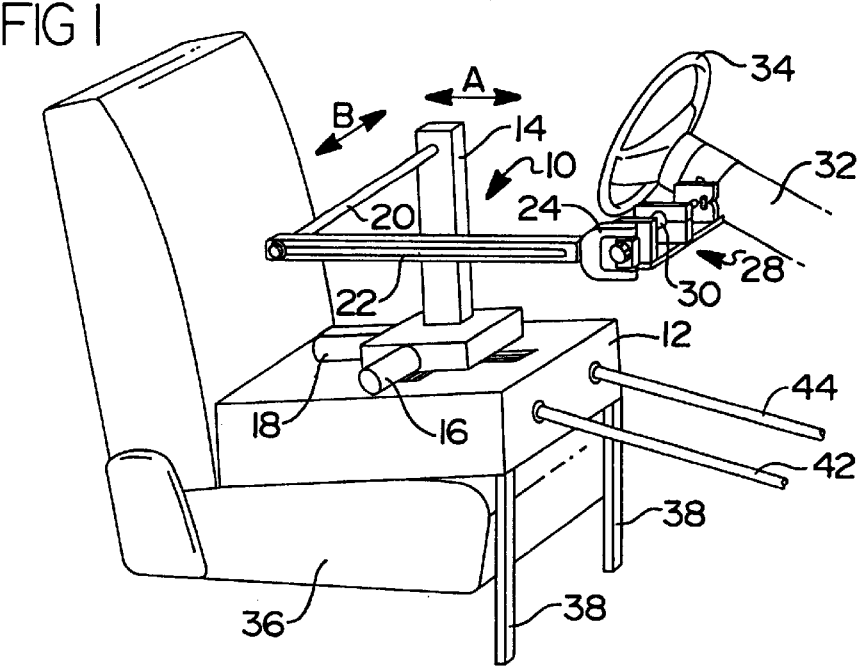
FIG. 1 is perspective view of a robotic test driving mechanism according to the principles of the present invention.
Figure 3:
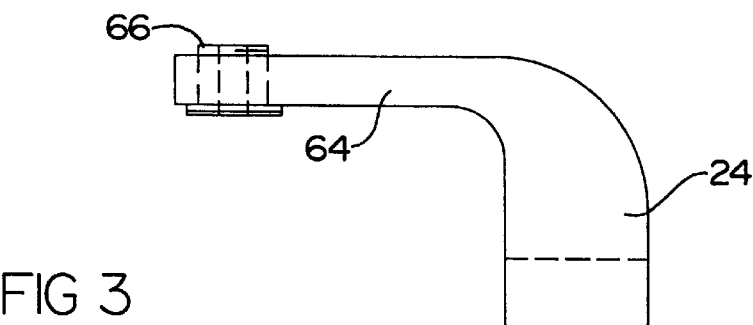
FIG. 3 is a plan view of the U-shaped bracket which is mounted to the end of the shift arm according to the principles of the present invention.
Figure 4:
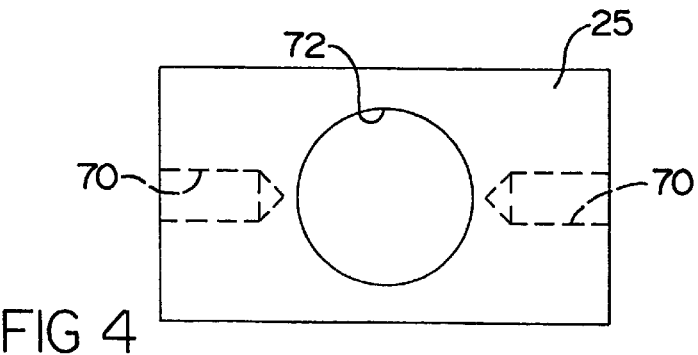
FIG. 4 is a plan view of the adapter plate according to the principles of the present invention.

With reference to FIG. 1, a robotic test driving system 10 for operating the shift lever, accelerator pedal and brake pedal of a vehicle. The robotic test driving mechanism includes a housing 12 which rests on the seat of a vehicle and supports a tower 14 which is operably driven by drive motors 16, 18 as is known in the art. Drive motor 16 drives the tower 14 in the fore and aft directions (as illustrated by arrow A) while drive motor 18 drives the tower 14 in the laterally leftward and rightward directions as illustrated by arrow B. A connecting arm 20 is mounted to the top of tower 14 and extends generally in the lateral direction relative to the longitudinal axis of the vehicle. A shift arm 22 is mounted to the connecting arm 20. A U-shaped bracket 24 is mounted on the end of shift arm 22 (best shown in FIG. 2) and supports an adapter plate 25 which is attached to a column shift bracket assembly 28 which is mounted on a shift lever 30. Shift lever 30 is mounted to a steering column 32. A steering wheel 34 is mounted to the steering column 32.

The housing 12 of the test driving system 10 is disposed on the seat 36 of the vehicle and includes a pair of legs 38 which help to support the housing 12 within the seat 36. A first pedal actuator 42 extends from the housing 12 and operatively engages the accelerator pedal (not shown). A second pedal actuator 44 extends from the housing 12 and engages the brake pedal (not shown). The first and second pedal actuators 42, 44 operate in a manner which is well known in the art.

With reference to FIG. 2, the shift arm 22 is provided with a recessed groove portion 50 and an elongated slot 52 formed in the bottom surface of the recessed groove portion 50. A threaded fastener 54 is received through the elongated slot 52 and is engaged with an end of connecting arm 20, as shown in FIG. 10. A thumb nut 56 is provided with a shoulder portion 58 which engages the recessed portion 50 of shift arm 22 for adjustably mounting the shift arm 22 to the connecting arm 20. A U-shaped bracket 24 is connected to the end of the shift arm 22 by an Allen head cap screw 60 which is inserted through a bushing 62 and threadedly engaged with an internally threaded bore provided in the end of shift arm 22. U-shaped bracket 24 includes a pair of arm portions 64 which are each provided with a hole therethrough which support a bushing 66 at an end portion of each arm 64. The adapter plate 25 is supported between the arms 64 of U-shaped bracket 24 by allen head screws 68 which extend through the bushings 66 and engage threaded bores 70 on opposite sides of adapter plate 25. Adapter plate 25 is provided with a hole 72 extending therethrough. A cap screw 74 (FIG. 5) is inserted in the hole 72 of adapter plate 25. A plastic washer 78 is slipped over the cap screw 74 and is secured in place by a snap ring 76. Cap screw 74 is provided with a groove 80 which receives the snap ring 76 and a radially outwardly extending flange portion 82 which abuts against the adapter plate 24. Cap screw 74 includes a first threaded bore portion 84 for threadedly receiving a screw portion of a hand knob 86. Cap screw 74 includes a second internally threaded portion 88 which is adapted to be engaged with a bolt 90 mounted to the column shift bracket assembly 28.

The column shift bracket assembly 28 includes a thin metal base plate 92 provided with a pair of parallel elongated slots 94. A pivot clamp block 96 including a lower block portion 96a and an upper block portion 96b pivotally mounted to the lower block portion by a chain link 98. Chain link 98 is connected to the upper and lower block portions 96a, 96b by pivot pins 100.

With reference to FIG. 8, the lower block portion 96a of pivot clamp block 96 includes threaded bores 102 for receiving threaded fasteners 104 for mounting the pivot clamp block 96 to the base plate 92. Furthermore, the lower block portion 96a is provided with a threaded bore portion 106 for mating with a threaded fastener 108 inserted through an opening in the upper block portion 96b for securing the pivot clamp block 96 in a closed position around a shift lever. The upper and lower block portions 96a, 96b are each provided with semi-circular opening portions 109a, 109b which receive the shift lever 30 therebetween when the pivot clamp block 96 is closed.

A second clamp block 110 is provided with a lower block portion 110a and an upper block portion 110b, each of which are provided with semi-circular opening portions 112a, 112b which combine to define an opening for receiving a knob 114 of the shift lever 30. Lower block portion 110a is provided with a pair of threaded bores 116 which receive threaded fasteners 118 which adjustably mount the clamp block 110 to the base plate 92 via slots 94. The lower block portion 110a also includes a pair of threaded bores 122 which are threadedly engaged by fasteners 129 which are inserted through openings 128 provided in the upper block portion 110b in order to secure the upper block portion 110b to the lower block portion 110a of clamp block 110.

An arm mounting block 130 is securely mounted to the base plate 92 using threaded fasteners. The bolt 90 is supported to the arm mounting block 130 and is engaged by the cap screw 74 which is supported by the adapter plate 25. The base plate 92 of column shift bracket assembly 28 is made of a metal material which is preferably capable of bending under excessive forces so that the base plate would give way before damage is done to the robotic test driving mechanism or the shift lever of the vehicle. The column shift bracket assembly 28 of the present invention is designed to grab the column gear selector lever 30 without marring the surface so that a robotic test driving mechanism can be utilized to actuate the shift lever of the vehicle automatically for testing purposes. The shift arm 22 provides the capability to adjustably reach shift levers at various distances from the robot.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A robotic device for moving a shift lever of a vehicle, comprising:

a shift actuator device adapted to be mounted in a seat of the vehicle;

an elongated shift arm having a longitudinally extending elongated slot, said shift actuator adjustably engaging said elongated slot of said shift arm; and a bracket mechanism connected to said elongated shift arm and adapted to be attached to a shift lever.

2. A robotic device for moving a shift lever of a vehicle comprising:

a shift actuator device;

an elongated shift arm having a longitudinally extending elongated slot, said shift actuator adjustably engaging said elongated slot of said shift arm; and a bracket mechanism connected to said elongated shift arm and adapted to be attached to a shift lever.

wherein said bracket mechanism includes a U-shaped bracket having a base portion attached to an end of said shift arm by a threaded fastener and a pair of arm portions pivotally supporting an adapter plate therebetween, said adapter plate being attached to a shift lever bracket adapted to be mounted to a shift lever of a vehicle.

3. The device according to claim 1, further comprising a thumb screw for adjustably connecting said shift arm said shift actuator device.

* * * * *